July 12, 1949.   L. GOODRICH   2,475,958
ELECTRIC LIGHT FOR MAGNETIC
ATTACHMENT TO AUTOMOBILES
Filed Feb. 26, 1948   2 Sheets-Sheet 1
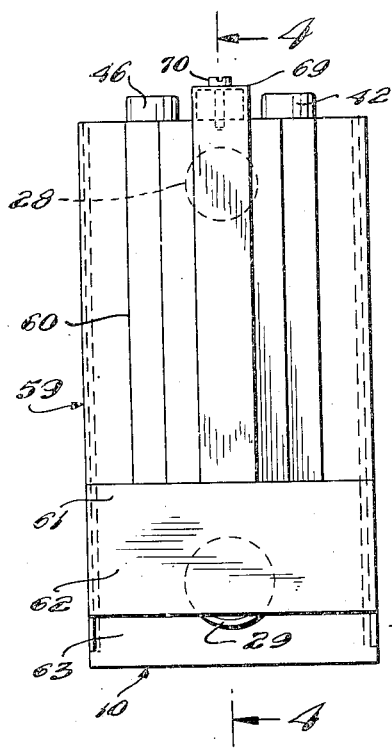
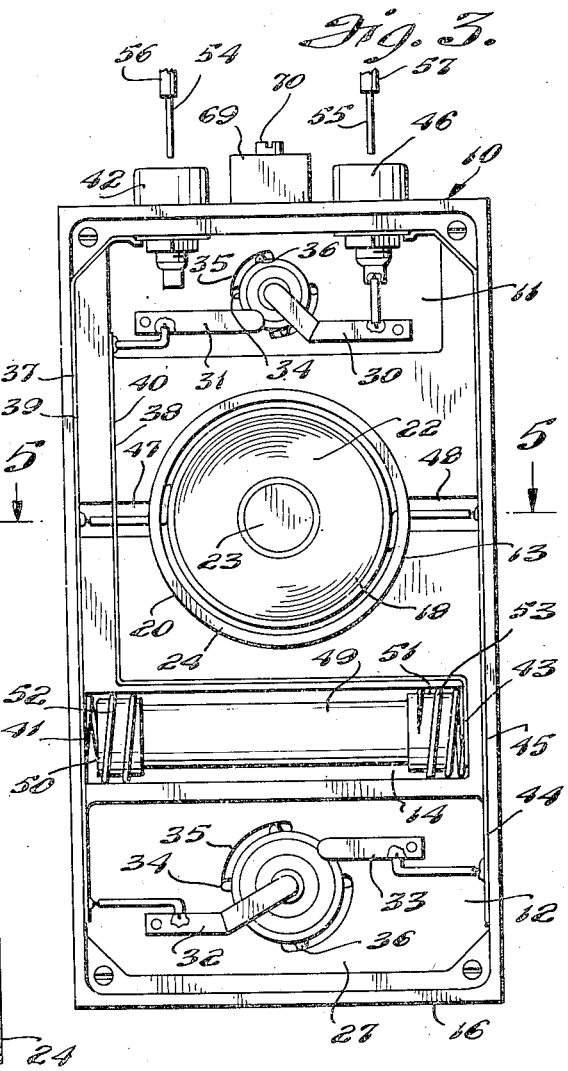
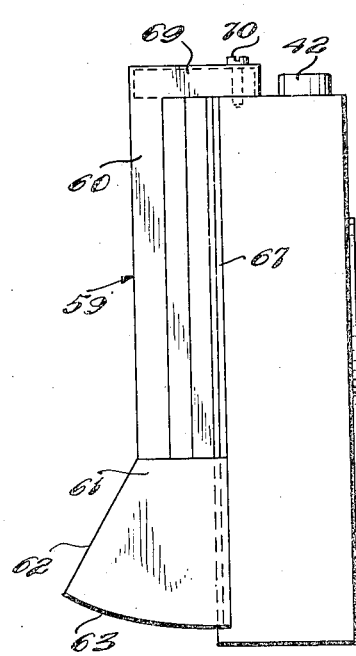
INVENTOR.
LOUIS GOODRICH
BY
Clark & Ott
ATTORNEYS July 12, 1949.
L. GOODRICH
2,475,958
ELECTRIC LIGHT FOR MAGNETIC ATTACHMENT TO AUTOMOBILES
Filed Feb. 26, 1948
2 Sheets-Sheet 2
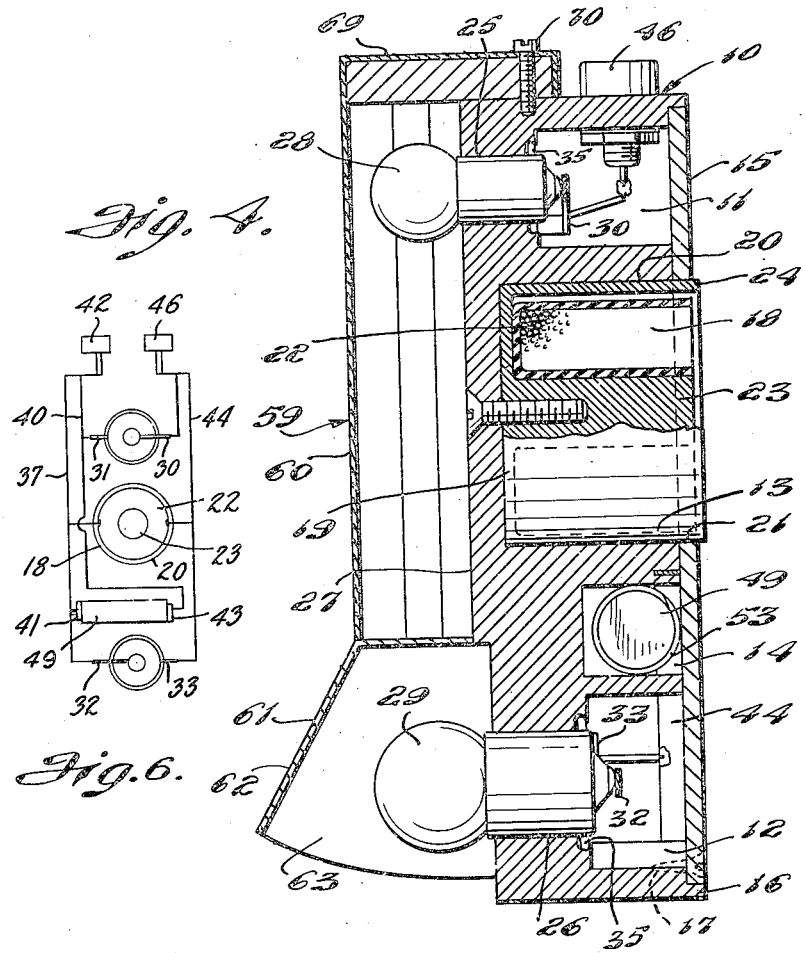
Fig. 4.
Fig. 6.
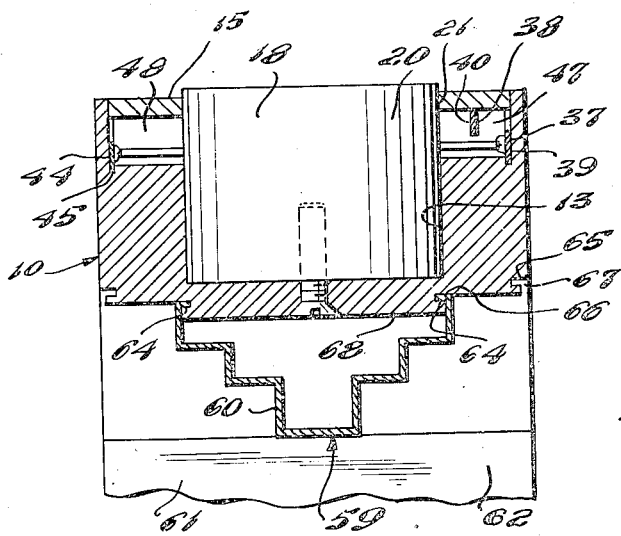
Fig. 5.
INVENTOR.
LOUIS GOODRICH
BY
Clark & Ott
ATTORNEYS Patented July 12, 1949

2,475,958

UNITED STATES PATENT OFFICE 2,475,958

ELECTRIC LIGHT FOR MAGNETIC ATTACH-
MENT TO AUTOMOBILES

Louis Goodrich, Hackensack, N. J., assignor to
The Louis Goodrich Corporation, Hackensack,
N. J., a corporation of New Jersey Application February 26, 1948, Serial No. 11,151

6 Claims. (Cl. 177—329)

1

This invention relates to portable electric lights and has particular reference to a light of said character adapted to be attached magnetically to a metal part of an automobile or the like so as to provide illumination for making repairs at night and which also emits an intermittent caution or safety light for approaching vehicles.

The invention has in view a novel arrangement for emitting an intermittent colored light and a continuous bright or white light together with an electro-magnet adapted for attachment to a metal part of an automobile or the like with the intermittent colored light providing illumination visible from a distance and with the continuous bright or white light having its rays directed downwardly for illuminating the work.

The invention has for a further object the provision of a casing providing a mounting for the operating parts and with conductor elements arranged in the casing for facilitating the removal and replacement of the parts.

The invention also resides in the provision of a transparent colored housing removably associated with the casing and adapted to enclose the lights with a bottom outlet for emitting bright or white light therethrough.

With the foregoing and other objects in view, reference is now made to the following specification and accompanying drawings in which the preferred embodiment of the invention is illustrated.

In the drawings:

Fig. 1 is a view in front elevation of an electric light for magnetic attachment to automobiles constructed in accordance with the invention.

Fig. 2 is a view in side elevation thereof.

Fig. 3 is a rear view of the same with the rear covering panel removed.

Fig. 4 is a vertical sectional view taken approximately on line 4—4 of Fig. 1.

Fig. 5 is a horizontal sectional view taken approximately on line 5—5 of Fig. 3.

Fig. 6 is a wiring diagram showing the electric elements and circuits of the device.

Referring to the drawings by characters of reference, the device includes a base or casing 10 fashioned of synthetic plastic material or other equivalent insulation material and which casing is of rectangular formation in vertical and horizontal cross-sectional configuration and is provided with rectangular shaped recesses 11 and 12 adjacent the opposite ends thereof and with a circular recess 13 and a rectangular recess 14 located intermediate the recesses 11 and 12. The

2 said recesses open through the rear of the casing and with the exception of the circular recess 13 are closed by a fiber panel 15. The casing is provided with a peripheral rim 16 within which the panel 15 is arranged and secured therein in covering relation with the recesses 11, 12 and 14 by screws 17.

Located in the circular recess 13 is an electromagnet 18 consisting of an iron casing having a forward wall 19 and an annular rim 20 which protrudes through the opening 21 in the panel 15. Arranged within the casing is a coil 22 wound on an iron core 23, secured at its inner end to the inner face of the front wall 19 of said casing. When the coil 22 is energized the annular rim 20 becomes magnetized so that the edge 24 thereof protruding through the opening 21 in the panel 15 may be magnetically secured to an iron or steel part of a vehicle for supporting the device thereon.

The recesses 11 and 12 are provided with reduced circular apertures 25 and 26 respectively which open through the front wall 27 of the casing forming sockets for receiving lamp bulbs 28 and 29 with the inner ends of the bulbs engaged by spring terminals 30 and 31, and 32 and 33 located respectively in the recesses 11 and 12. In order to retain the lamp bulbs 28 and 29 in position in the apertures 25 and 26 the peripheral walls of said apertures are provided with oppositely disposed slots 34 which communicate at their inner ends with arcuate recesses 35 in the inner face of the front wall 27 through which slots the lugs 36 of the lamp bulbs are slidable so that when the bulbs are arranged in the apertures 25 and 26 respectively they may be rotated to position the lugs 36 in the recesses 35.

The spring terminals 30 and 31 are affixed to the inner face of the front wall 27 of the casing in the recess 11 and are respectively connected with a conductor ribbon 38 arranged in a slot 40 and with a terminal post 46. A conductor ribbon 37 located in a slot 39 is provided with a terminal 41 arranged at one end of the rectangular recess 14 and has its extreme lower end projecting into the recess 12 and disposed against one end thereof with the opposite end of the ribbon secured to the inner end of a terminal post 42 protruding through the end wall of the casing. The conductor ribbon 38 extends from the slot 40 into the rectangular recess 14 and is provided with a terminal 43 located against the end wall of the recess 14 oppositely disposed from the terminal 41 and in transverse alignment therewith.

The spring terminals 32 and 33 are affixed to the inner face of the front wall 27 in the recess 12 and are respectively connected with the lower end of the conductor ribbon 37 and the lower end of a conductor ribbon 44 projecting into the recess 12 through a slot 45 in the casing. The upper end of the conductor ribbon 44 extends into the recess 11 and is secured to the inner end of the terminal post 46 projecting through the end wall of the casing.

The circular recess 13 is provided with laterally extending recesses 47 and 48 which communicate with the slots 39 and 45 so as to expose the conductor wires 37 and 44. The ends of the coil 22 of the electro-magnet 18 extend through the recesses 47 and 48 and are connected with the conductor ribbons 37 and 44 respectively for connecting the coil in circuit therewith.

The lamp bulb 28 is intermittently operated by means of a switch element 49 of the usual bi-metallic type located in the rectangular recess 14 and having metallic caps 50 and 51 which are engaged by coiled springs 52 and 53 tensioned against the terminals 41 and 43 of the conductor ribbons 37 and 38 for resiliently supporting the switch in position between said conductor terminals and for establishing electrical contact therewith.

The terminal posts 42 and 46 are in the form of jacks for receiving terminal plugs 54 and 55 secured to the free ends of conductor cords 56 and 57 for establishing electrical connection with a source of current supply such as the battery of a motor vehicle, the conductor cords 56 and 57 being suitably provided with means for plugging into terminals on the dashboard of the vehicle or into the usual cigarette lighter thereon.

Constructed in this manner the upper light bulb 28 which is located adjacent the top of the casing will be actuated intermittently while the lower light bulb 29 will emit a continuous light and the electro-magnet will be continuously energized so as to retain the device in position on a metal part of the vehicle.

Mounted on the forward face of the casing is a transparent colored light bulb housing 59 having a reduced upper portion 60 and an enlarged lower portion 61 provided with an outwardly flared front wall 62 and an open lower end 63. The upper and lower portions 60 and 61 of the housing are provided with inturned side edges 64 and 65 respectively which are slidable in grooves 66 and 67 formed in the side edges of the outwardly projecting medial portion 68 and in the side edges of the casing respectively for slidably disposing the housing in position on the casing in covering relation with the lamp bulbs. The housing is formed with a rearwardly projecting lug 69 through which is adapted to be inserted a screw 70 for securely fastening the housing to the casing. The housing is fashioned of synthetic plastic material or other equivalent transparent material and the same is red in color so as to provide a warning light to approaching vehicles and the like, while the open lower end 63 permits of the emission of white light so as to constitute a work light for making repairs to the vehicle at night.

What is claimed is:

1. In a device of the character described, a casing constructed of insulation material having independent recesses opening through one face thereof and openings extending through the forward face of said casing and into two of said recesses respectively, contact members located at the inner ends of said openings forming electric sockets for receiving electric light bulbs, conductor elements embedded in said casing and connected with the contact members of said electric sockets, a bi-metallic switch located in another of said recesses and connected with one of said conductor elements in circuit with one of the electric sockets, said switch being adapted for interrupted engagement for interrupting the circuit with said electric socket for causing an alternate flashing of the light bulb disposed therein, and a transparent colored housing secured on the forward face of said casing in covering relation with the light bulbs disposed in said sockets and said casing having an open lower end for emitting a downwardly directed continuous light from one of said light bulbs and said alternate flashing through the upper portion of said housing providing a warning light.

2. In a device of the character described, a casing constructed of insulation material having independent recesses opening through one face thereof and openings extending through the forward face of said casing and into two of said recesses respectively, contact members located at the inner ends of said openings forming electric sockets therewith for receiving electric light bulbs, an electro-magnet located in another of said recesses and having an annular wall protruding through the rear of said casing for magnetically attaching the device to a metal part when the electro-magnet is energized, conductor elements embedded in said casing and connected with said electric socket contact members and with said electro-magnet, and a transparent colored housing secured on the forward face of said casing in covering relation with said light bulbs and having an open lower end for emitting a downwardly directed light from one of said bulbs and a colored light through the upper portion of said housing.

3. In a device of the character described, a casing provided with electric light sockets for receiving light bulbs disposed in protruding relation from the forward face thereof, said casing having longitudinally extending grooves in the opposite side portions thereof and a transparent colored housing having inturned side edges slidably engaged in said grooves for securing the housing on the forward face of said casing in covering relation with the light bulbs disposed in said sockets, and said casing having an open lower end for emitting a downwardly directed light therethrough and a warning colored light through the upper portion of said housing.

4. In a device of the character described, a casing constructed of insulation material having independent recesses opening through one face thereof and openings extending through the forward face of said casing and into two of said recesses respectively, grooves extending longitudinally in the rear face of said casing and opening into said recesses, conductor elements arranged in said grooves and projecting into said recesses, contact members arranged in said recesses at the inner ends of the openings through the forward face of said casing and connected with said conductor elements, said casing having grooves extending into said openings through the forward face thereof for receiving electric light bulbs in engagement with said contact members, an electro-magnet located in another of said recesses and arranged substantially medially of the casing for magnetically attaching the device to a metal part when the electro-magnet is energized, said casing having longitudinally extending grooves in the opposite side portions thereof and a transparent colored housing having inturned side edges slidably engaged in said grooves for securing the housing on the forward face of said casing in covering relation with the light bulbs disposed in said sockets, and said casing having an open lower end for emitting a downwardly directed light therethrough and a warning colored light through the upper portion of said housing.

5. In a device of the character described, a casing constructed of insulation material having openings extending through the forward face of said casing and into the hollow interior thereof, contact members located at the inner ends of said openings forming electric sockets therewith for receiving electric light bulbs, conductor elements connected with the contact members of said electric socket, a bi-metallic switch located within said casing and connected with one of said conductor elements in circuit with one of the electric sockets, said switch being adapted for interrupted engagement for interrupting the circuit with said electric socket for causing an alternate flashing of the light bulb disposed therein, and a transparent colored housing secured on the forward face of said casing in covering relation with the light bulbs disposed in said sockets and said casing having an open lower end for emitting a downwardly directed continuous light from one of said light bulbs and said alternate flashing through the upper portion of said housing providing a warning light.

6. In a device of the character described, a casing constructed of insulation material having openings extending through the forward face thereof and into the hollow interior of said casing, contact members located at the inner ends of said openings forming electric sockets therewith for receiving electric light bulbs, an electro-magnet located within said casing and having an annular wall protruding through the rear thereof for magnetically attaching the device to a metal part when the electro-magnet is energized, conductor elements connected with said electric socket contact members and with said electro-magnet, and a transparent colored housing secured on the forward face of said casing in covering relation with said light bulbs and having an open lower end for emitting a downwardly directed light from one of said bulbs and a colored light through the upper portion of said housing.

LOUIS GOODRICH.

REFERENCES CITED

The following references are of record in the file of this patent:

UNITED STATES PATENTS

| Number | Name | Date |
| --- | --- | --- |
| 1,951,431 | Meehan | Mar. 20, 1934 |
| 2,165,562 | Mack et al. | July 11, 1939 |
| 2,224,742 | Muldoon | Dec. 10, 1940 |